Patented May 29, 1928.

1,671,422

UNITED STATES PATENT OFFICE.

JOSEF HALLER, OF WIESDORF, GERMANY, ASSIGNOR TO GRASSELLI DYESTUFF CORPORATION, OF NEW YORK, N. Y., A CORPORATION OF DELAWARE.

AZO DYESTUFFS.

No Drawing. Application filed June 23, 1927, Serial No. 201,028, and in Germany June 28, 1926.

I have found new and valuable azo dyestuffs which are obtainable by coupling a diazotized amino-naphthol-ether with a 2.3-hydroxynaphthoic-acid arylid and which correspond to the general formula:

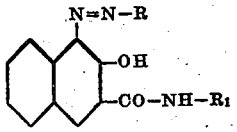

wherein R stands for a naphthalene residue substituted by at least one alkyloxy-group, and $R_1$ for an aryl-residue substituted or not. They are distinguished by clear violet shades of excellent fastness to chlorine, light and boiling.

This result is of special interest since up to the present time violet shades in this class of azo dyestuffs have not been known.

My new products are in a dry state dark powders which are soluble in concentrated sulfuric acid with blue color. By reduction with zinc and hydrochloric acid they yield a 1-amino-2-hydroxy-3-naphthoic acid-arylid and an ether of an amino-naphthol.

The coupling process may be carried out in substance or on fiber.

The following example will illustrate my invention without limiting it thereto.

Example I.

2.5 parts by weight of the hydrochloride salt of the 7-methoxy-1-amino-naphthalene, melting at 81° C., are dissolved in water and diazotized in the usual manner after the addition of 4 parts by weight of hydrochloric acid. In order to increase the stability of the diazo-compound, naphthalene-sulphonic acids such as 1.5. naphthalene-disulfonic acid may be admixed. Water is then added to increase to 1000 parts by volume. After having neutralized the excess of mineral acid with sodium acetate, a cotton hank, previously treated with a solution containing 2.5 grams per litre of 2:3-hydroxy-naphthoic acid-β-naphthalids is introduced and agitated in the solution for about 20 minutes. After rinsing, the goods are soaped in boiling water. A clear reddish violet is thus obtained possessing very good fastness to chlorine, boiling and light. The dyestuff probably has the following formula:

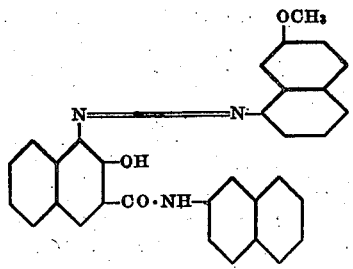

When prepared in substance, it forms a reddish violet powder, which dissolves in sulphuric acid with a blue color-action. As already stated, it can be produced on a substratum and applied as a pigment dyestuff. When in this dyestuff the methoxy-group is replaced by the ethoxy-group a more reddish violet shade is obtained.

Example II.

2.5 parts by weight of the hydrochloride salt of the 1-methoxy-8-aminonaphthaline (Berichte der deutschen chemischen Gesellschaft, volume 39, page 3336) are dissolved in water and diazotized in the usual manner. Water is then added to this solution in order to increase to 1000 parts by volume. After having neutralized the excess of mineral acid with sodium carbonate, a cotton hank, previously treated with an alkaline solution containing 6 parts by weight β-hydroxy-naphthoyl-2-amino-1, 4-hydroquinone-dimethylether dissolved in 1000 parts by volume of water, is introduced to this diazo solution and agitated in this solution for about 20 minutes. After rinsing, the goods are soaped in boiling water. A red violet is thus obtained possessing very good fastness to chlorine, to boiling and to light. When prepared in substance this dyestuff represents a Bordeaux dyed powder, soluble in concentrated sulfuric acid with a blue shade. The dyestuff probably has the following formula:

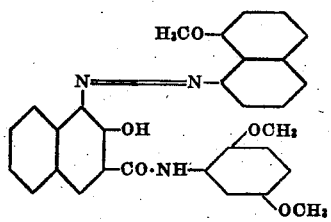

I claim:

1. As new products azo dyestuffs of the general formula:

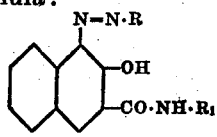

in which R stands for a naphthaline residue substituted by at least one alkyloxy-group, and $R_1$ for an aryl-residue substituted or not, which are in a dry state dark powders soluble in concentrated sulfuric acid with blue color and yielding clear violet shades of excellent fastness to chlorine, light and boiling.

2. As new products azo dyestuffs of the general formula:

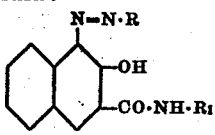

in which R is a naphthalene residue substituted by at least one alkyloxy-group and $R_1$ a naphthalene residue substituted or not, which are in a dry state dark powders soluble in concentrated sulfuric acid with blue color and yielding clear violet shades of excellent fastness to chlorine, light and boiling.

3. As a new product the azo dyestuffs of the formula:

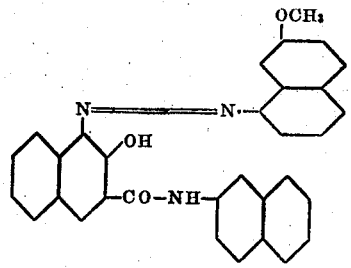

which is in a dry state a reddish violet powder dissolving in sulfuric acid with a blue coloration and yielding clear violet shades of excellent fastness to chlorine, to light and to boiling.

4. Materials dyed with the dyestuffs described in claim 1.

5. Materials dyed with the dyestuffs described in claim 2.

6. Materials dyed with the dyestuff described in claim 3.

In testimony whereof I have hereunto set my hand.

JOSEF HALLER.